United States Patent [19]

Haas et al.

[11] Patent Number: 4,576,530

[45] Date of Patent: Mar. 18, 1986

[54] INDEXING DEVICE

[76] Inventors: Gene F. Haas, 18819 Dylan St., Northridge, Calif. 91324; Kurt P. Zierhut, 10155 Nevada Ave., Chatsworth, Calif. 91311

[21] Appl. No.: 586,425

[22] Filed: Mar. 5, 1984

[51] Int. Cl.⁴ .............................................. B23D 7/08
[52] U.S. Cl. ................. 409/223; 29/48.5 R; 409/221
[58] Field of Search ................ 29/48.5 R, 48.5 A, 49; 279/5; 409/221-223

[56] References Cited

U.S. PATENT DOCUMENTS

| 2,042,847 | 6/1936 | Holschneider | 409/222 X |
| 2,309,241 | 1/1943 | Curtis | 409/223 |
| 2,788,672 | 4/1957 | Liska | 29/49 |
| 3,877,322 | 4/1975 | Benjamin et al. | 279/5 X |
| 4,103,589 | 8/1978 | Francis | 409/223 |

Primary Examiner—Eugene F. Desmond
Attorney, Agent, or Firm—Sanford Astor

[57] ABSTRACT

The invention relates to an index fixture system comprising a casting mounting, an indexing fixture which provides rotative positioning of a work held within a collet holder spindle. A worm gear and worm affixed to a synchronous stepping motor, giving a total of 28,800 index positions, controls the indexing fixture, the motor being controlled by a computer program containing a pre-computed list of motor step times.

5 Claims, 3 Drawing Figures

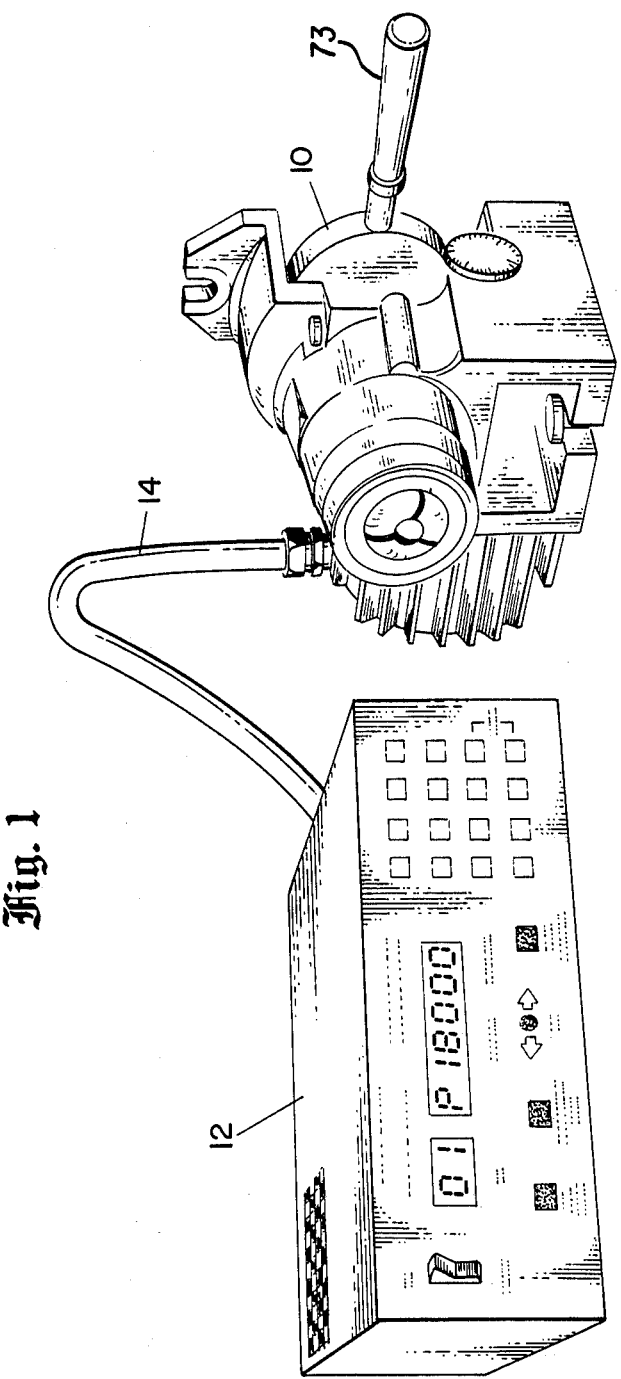
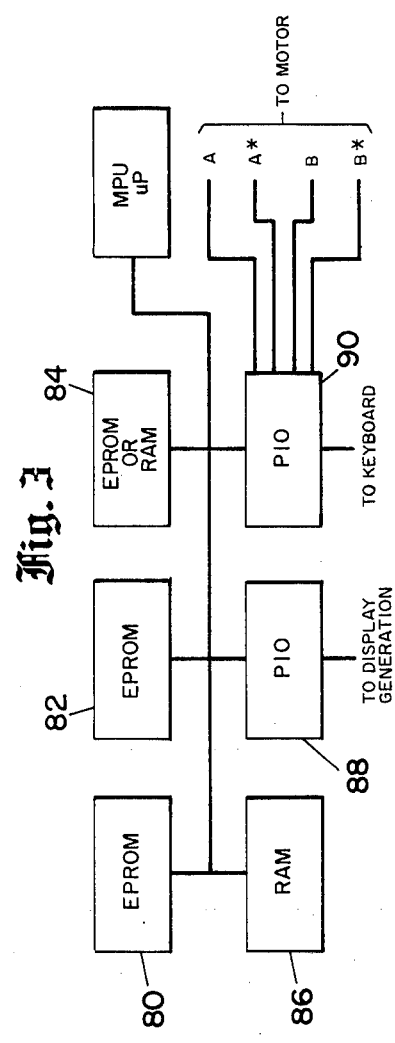
Fig. 1
Fig. 3

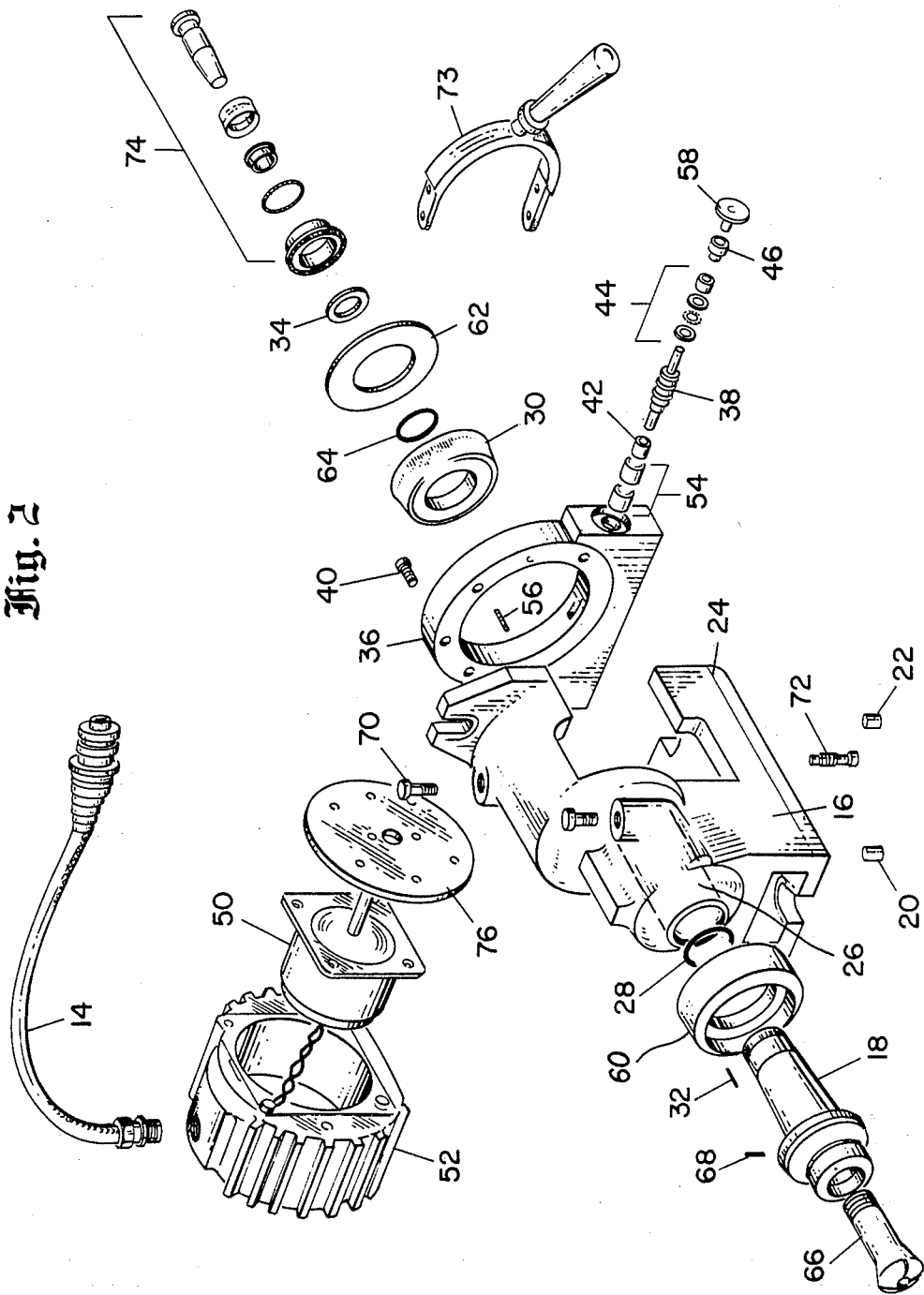

INDEXING DEVICE

BACKGROUND OF THE INVENTION

Basically, an indexing head is a device that holds a part firmly in place in order that a machining operation (such as drilling a hole) can be accomplished. A spindle within the head can be rotated to a new radial position and another operation performed, thus called an indexing head. While this idea basically has been around since the beginning of machine shops, there have been many devices built and used to accomplish the task. They vary in size, the method of holding the work piece, and the means of rotating the work.

The basic spindle and casting of a standard indexing head was originally designed by Charles Tree and patented March, 1941, U.S. Pat. No. 2,233,858. His device describes a body that houses a rotating spindle. The inside of the spindle has been conformed to accept a collet. A collet can be thought of as three fingers grabbing the outside of a round part. These fingers are then drawn into a taper inside the spindle causing the fingers to tighten round the work, holding it firmly so that work can be performed. A flat plate was then fixed to the rear of the spindle. This plate contained a number of holes (usually 20 or 24) and was designed so that a pin located in the body could drop into the holes in the plate and lock the spindle in place. By lifting the pin out of the hole in the plate the spindle could then be rotated to another position and the pin reinserted to lock the spindle. A very useful idea incorporated into the plate was the ability to lock out any number of holes so that the pin could drop into only the holes desired. The head tree designed was small in nature and easy to use. The head was so successful that one can be found in almost every machine shop today.

A patent was granted to Robert Path in 1972, U.S. Pat. No. 3,661,403, for an improvement to the indexing fixture of Charles Tree. Path's idea was to overcome the limitations of 20 or 24 position indexing by designing an indexing pin that used a multi-tooth serated pin that fit into a corresponding gear to give a higher number of indexing positions. The serations were designed to give 360 individual stop positions or 1 degree divisions. The major flaw to this design was that there was no way of blocking unnecessary positions. The operator would have to locate each desired stop visually before allowing the pin to lock into the plate resulting in an incredibly slow and tedious operation.

OBJECTS OF THE INVENTION

It is an object of the present invention to provide an indexing head comprising a rotating spindle inside of a body. In place of the plate with holes to provide index positions, there is a worm gear and worm to which is affixed a synchronous stepping motor. (Traditional terminology calls the larger gear being driven the "worm gear" while the smaller pinion gear, the driver, the "worm".) This arrangement leads to two major improvements. The first is that the number of individual index positions is dramatically increased up to 28,800 positions. The second major advantage is that through the use of an electronic control, the head can be made to index to any desired position and automatically lock in place thereby skipping over undesired positions. An additional improvement to the indexing head is the inclusion of precision tooling locations that the user can utilize to standardize setups thereby reducing setup times.

These and other objects will be obvious from a description of the drawings in which:

FIG. 1 is a perspective view of the indexing fixture and control system of the present invention;

FIG. 2 is an exploded view of the indexing fixture; and

FIG. 3 is a block diagram of the control components.

Referring to FIG. 1 there is shown the indexing fixture 10 and the control box 12 with connecting wires 14.

Referring to FIG. 2, the index fixture consists of a cast iron body 16 that holds the spindle 18. The body has two mounting planes that are precision machined flat and perpendicular to one another as well as parallel and true to the spindle. These two surfaces allow the indexing fixture to be mounted in both horizontal and vertical planes. On the bottom plane of the casting 16 parallel to the spindle 18 are located two precision bored holes that will accept tooling pins 20,22 at opposite ends of the casting with a precise distance between them. They are precisely centered and parallel with the spindle's centerline. Since these holes define the fixture's location and alignment they can be used to accurately position the head with the user's tooling without the need for realignment each time. This is useful on qualified setups on Numerical Control equipment. To further aid in setups, a small lip 24 perpendicular to the bottom plane and vertical plane while being parallel to the spindle 18 is provided. By aligning lip 24 to the machine tool table, accurate positioning of the spindle 18 is accomplished.

The spindle 18 is located in approximately the center of the casting 16 and fits into a tapered bore 26 shown by dotted lines inside of the casting 16. A thrust washer 28 located between the spindle 18 and body prevents the spindle from lateral movement and provides adjustment between the spindle taper and body taper. The rear of the spindle protrudes from the body casting onto which the worm gear 30 is fitted. Worm gear 30 is allowed to move on the rear of the spindle 18 in a lateral direction but is prevented from radial motion by means of a key 32, which maintains precise alignment between worm gear 30 and spindle 18. The worm gear 30 is then tightened in position by means of a nut 34 on the spindle 18 which forces the worm gear 30 further onto the spindle until it contacts the casting body. This surface of the casting is precision machined perpendicular to the spindle bore 26. The spindle 18 is precisely held between the thrust washer 28 on the front and the worm gear 30 on the back such that lateral movement can be adjusted to near zero tolerance.

A problem with worm and worm gears is the centering of the worm to the worm gear. The centerplane of the worm gear must intersect the center of the worm. If this alignment is off by more than a few thousandths of an inch more pressure will be exerted on one side resulting in faster wear and greater initial backlash. The tradiitional approach to the problem is to fix the lateral movement of either the worm gear or worm and then adjust the alignment of the moveable piece by using shims or other methods. This invention eliminates this alignment. Both the worm gear 30 and worm gear housing 36 (which houses the worm) are allowed to move laterally. The rear of the body casting 16 where the spindle 18 protrudes is machined true and perpendicular to the spindle bore 26 and provides a common plane for lateral alignment of both worm gear 30 and worm gear housing 36. The worm gear 30 abuts this plane by moving laterally along the spindle 18 while the worm gear housing 36 is directly bolted to the plane. This results in the same plane being used for both items. The critical tolerances then become the distance between the face of the worm gear 30 to center of the cut tooth and the distance of worm gear housing face to the center of the worm, both of which are easily controlled in the machining process. If these tolerances are held closely, no lateral adjustment in assembly is necessary.

The gear housing itself 36 is a one piece casting that surrounds the worm gear and holds the worm 38. It is inserted midway in the casting body 16 and is essentially perpendicular to the spindle 18. It is bolted in place by five allen bolts 40. A one piece casting is used because it provides a higher degree of rigidity and accuracy than could be obtained in a multipiece casting.

Physically the housing 36 is shaped like a doughnut with a rectangular form on the lower portion. It houses the worm 38 which is held between sets of radial and thrust bearings 42, 44 located on each side of the worm. Lateral movement of the bearings is adjusted by a threaded screw 46 to eliminate backlash. Each portion of the rectangular form extends beyond the main body casting 16 which has been cut away to accept the housing. On the far side of the casting 16 a mounting has been provided for the synchronous stepping motor 50. The motor 50 is enclosed in a casting 52 designed for heat convection and protection against chips and coolant. The motor is directly connected to the worm through a universal joint 54.

The universal joint 54 must provide for misalignment between the motor 50 and worm 38, absorb heat expansion and contraction between motor 50 and worm 38, absorb resonances of the stepper motor 50 and must be able to be separated into two halves for assembly purposes. The joint is separated into a male and female half. The male half which is attached to the motor 50 consists of a cylinder of metal which is bored on one side to accept the motor shaft. The opposite end is flat but has two opposing holes drilled parallel to the cylinder. Two pins are inserted in the holes so that half of their length protrudes outward. These are the drive pins.

The female portion is of similar design and is connected to the worm 38. There are two holes drilled into the female portion to accept the pins from the male portion when coupled, however, the diameter is approximately 2 to 3 times bigger. Inside these larger holes is inserted a piece of silicon rubber tubing whose internal diameter and outside diameter match those of the male and female portions. They are glued in place.

Assembly is made by pushing the male into the female. The resulting joint provides all the elasticity and damping required.

In order to obtain close fitting of the worm 30 to worm gear 38 a method is provided to adjust gear clearance. A dowel pin hole is drilled in both the housing casting 36 and body casting 16. It is located on spindle centerline between the worm gear 30 and motor 50 in approximately the same radial pattern as the allen bolts that secure the housing. Adjustment is obtained by rotating the housing about a dowel pin that connects the housing 36 to the body 16 such that a precise fit between the worm 38 and worm gear 30 can be obtained. The five allen bolts 40 are then tightened to secure this tolerance.

On the other end of worm 38 opposite the motor side the worm 38 protrudes just below the face of the casting. A small indicator wheel 58 is attached to the worm shaft. It is a 1.5 inch diameter disc which has been radially marked into 50 divisions each which represents 6 minutes of spindle rotation. This is very useful in fine adjustment of the spindle position. Another indicating wheel 60 is provided on the main spindle and has 72 markings each at 5 degrees. Therefore, by using the spindle indicator ring 60 in conjunction with worm indicator disc 58 precise spindle angles can manually be set such as in set up procedures.

Another feature of the indexing head is a self-locking capability. This is accomplished by three factors. While worm gears and worms should not be considered self-locking for safety reasons, fine pitch worming does exhibit self-locking characteristics. This is to say that the worm gear cannot drive the worm so that the spindle is essentially "locked" in place. A second additional locking mechanism is provided by the stepper motor 50. After indexing, motor current is maintained in the motor 50 preventing the worm shaft from rotating thus providing additional locking. With these two factors in play both the spindle 18 and worm 38 are essentially locked in position and the spindle 18 cannot be rotated by any means.

A third mechanism is used to compensate for any backlash that may exist between worm gear 30 and worm 38. The worm gear 30 is located inside the worm gear housing casting 36. The housing 36 is designed to accept a cover 62 that surrounds the worm gear 30. Inside the cover 62 are located o-rings 64 that when assembled exert pressure between the worm gear 30 and housing 36. This pressure dampens any spindle movement and provides spindle tension while indexing, thus keeping the backlash to one direction.

The collet 66 which fits in spindle 18 with collet key 68 holds the part on which the machining is done. The key 68 slips into a slot in the collet 66 to prevent it from rotating or unscrewing.

Bolts 70 and 72 fasten the collet closure handle, 73 also shown in FIG. 1. The collet draw bar assembly 74 fits into the spindle 18 and attaches to collet 66.

A motor mount plate 76 is adapted as the mounting surface for the motor 50.

Thus, the major features of the new indexing head, are:

1. Utilizing a stepper motor to provide 28,800 divisions on spindle through a 72 to 1 worm gear and worm.

2. Locking the spindle in place by using 14½ degree pressure angle on the worm and maintaining power in the motor.

3. Additional locking is provided by a rubber seal pressing against the worm gear.

4. Dials are provided on both the spindle and the worm to indicate positions.

5. Backlash and wear adjustment is provided by rotating the gear housing about a pin.

6. An indexing mechanism is embodied in a one piece casting thereby giving a high degree of strength.

7. The motor is connected through a simple universal joint that compensates for angular misalignment, expansion and contraction of both motor and worm, and utilizes silicone rubber to dampen motor oscillations.

8. The method of providing the precise positioning of the centerline of the worm gear to the worm is simplified.

9. A small precision machined lip at the base of the casting which is perfectly parallel to the spindle is provided for the operator to align the indexing head during setups. Also, two precision bored diameter holes spaced at opposite ends on the bottom of the base of the casting, which are precisely centered and held parallel to the same spindle, are provided for locating the indexing head on user tooling thereby enabling setups that do not require subsequent alignments.

The control system 12 for controlling the stepper motor 50 from a microprocessor based control provides the means to accurately move the stepper motor over long distances and at high speeds. The motor control system for operating a stepping motor addresses the problem common to most stepper motor controller designs, in that the motor must be accurately accelerated in a linear manner, moved through a specified distance at a specified velocity, decelerated in a linear manner, and brought to a stop. This is done by a computer algorithm and a method of interfacing an algorithm to the electronics. The algorithm is suited for operation on an 8 bit microprocessor.

The control system involves the following problems:
 1. The complexity of the electronics must be kept low in order to reduce costs as much as is possible.
 2. An eight bit microporcessor is the only computing element to be used.
 3. The motor must be accurately accelerated to at least 6000 steps per second.
 4. It must be possible to quickly change motor parameters in order to apply to new devices.
 5. Microprocessors are severely limited in their ability to perform complex mathematical calculations quickly.

When controlling a stepper motor, the goal is normally to move the motor through a precise number of steps. In this application the goal is also to move the motor as fast as is possible. Since the motor cannot reach the highest speed instantly, a period of time must be spent accelerating the motor, followed by a continuous motion interval, followed by a period of time to decelerate the motor.

To accomplish this, there is provided a mechanism by which an 8 bit microprocessor can accurately accelerate a stepper motor as high as 2000 steps per second. It does this while maintaining an accuracy of 1% or better. It comprises electronics and a computer program stored in a read only memory. It is applicable to stepper motor drivers of any size and power, as the results of using it are uniform motion control steps.

The control of each of the phases is provided by a microprocessor. It can turn each phase on and off individually.

The stepper motor is a four phase stepper. It requires that electrical power be applied to one or two phases in the proper sequence in order to move the motor.

It is necessary to compute the period of each step while the motor is in motion. The delays are computed only once, when the motor parameters are specified. This is done in one of two ways. For constant parameters, they are calculated by another computer and put into a read-only-memory for later use in this algorithm. For cases where the parameters are likely to change or are entered by an operator, the periods are computed by the motor controller only once and subsequently stored into the memory of the controller.

In either case above, when it comes time to move the motor, the delay periods do not need to be computed, as they are already stored in memory. The list of periods are stored in memory in the sequence in which they would be used to accelerate the motor. Once the maximum velocity is reached, the last period in the table is used as the period for constant speed motion. When it comes time to decelerate the motor, the list of periods is used in reverse order to bring the motor to a stop again.

The end result of this is that there is a list of step delay times in microseconds which is defined by the following:
 1. The minimum speed of the stepper motor,
 2. The maximum speed of the stepper motor,
 3. The acceleration rate (the time spent getting from the lowest speed to the highest speed).

FIG. 3 is a block diagram of the components.

EPROMs 80 and 82 are devices which hold permanent program storage. The third device 84 is either EPROM for permanent storage of motor parameters and the delay table or a RAM which holds read/write memory for storage of the delay table after its computation. The fourth device 86 is a RAM for storage of the applications program consisting of step sizes, feed rates, loop counts, motor position, and motor phase.

The first PIO 88 is used only for display generation. Eight output lines control which one of the digits is enabled and eight more output lines control which of the segments is on. The second PIO 90 is used for several purposes. Four outputs control which of the four motor phases are on. Five outputs and four inputs are used to detect key presses on the front panel. One output is used to control the power setting to the controller so that power consumption is reduced when it is at a standstill. One output is used to drive a relay to indicate to external CNC equipment that the control is finished. A last input is used to sense when a supply failure occurs.

The pre-computed list of motor step times also provides for a method of changing the feed rate of the indexing head. The feed rate is the top speed at which the head will rotate. The highest feed rate operates as described above where the delays time list is isued all the way to the end or shortest time (highest speed). Lower feed rates simply do not use all of the precomputed list; they stop a point in the list which corresponds to the operator specified speed. In this manner the feed rate may be separately specified for each step.

The combination of this unique control system and the inique indexing unit provides a vast step forward in the art.

Having thus described the invention, it is desired that it be limited only by the scope of the appended claims.

We claim:
1. An indexing fixture for rotative positioning of a work comprising a casting mounting, a rotating spindle mounted in said mounting, a collet in said spindle, a worm and worm gear adapted to rotate said spindle, a synchronous stepping motor adapted to control the rotation of said worm, the motor and worm connected by a universal joint, wherein the worm and worm gear are contained in a housing, O-rings inside the housing adapted to exert pressure between the worm gear and worm gear housing.
2. The device of claim 1 comprising an aligning lip on said mounting parallel to the spindle
3. The device of claim 1 in which the casting mounting is machined true and perpendicular to the spindle to provide a common plane for lateral alignment of both the worm gear and worm gear housing which is bolted to the casting mounting.
4. The device of claim 1 in which indicator wheels are attached to both the worm shaft and the spindle to provide fine adjustment of the spindle position.
5. The device of claim 1 comprising a microprocessor to control the rotation of the stepping motor.

* * * * *